United States Patent [19]

Yamada et al.

[11] Patent Number: 4,625,540
[45] Date of Patent: Dec. 2, 1986

[54] CONVEYOR IN PLASTIC WORKING MACHINE

[75] Inventors: Hiroyasu Yamada, Kawagoe; Motoatsu Shiraishi, Sakado; Ken Tazou, Hidaka; Mitsuki Nakamura, Niiza; Ryoichi Kageyama, Sayama; Akira Namiki, Tokorozawa; Masaru Sasagawa, Sayama, all of Japan

[73] Assignee: Honda Giken Kogyo Kabushiki Kaisha, Tokyo, Japan

[21] Appl. No.: 692,800

[22] Filed: Jan. 18, 1985

[30] Foreign Application Priority Data

| Jan. 20, 1984 | [JP] | Japan | 59-8097 |
| Nov. 6, 1984 | [JP] | Japan | 59-233968 |
| Nov. 6, 1984 | [JP] | Japan | 59-233969 |
| Nov. 12, 1984 | [JP] | Japan | 59-238101 |
| Nov. 12, 1984 | [JP] | Japan | 59-238102 |

[51] Int. Cl.⁴ .............................. B21J 13/08
[52] U.S. Cl. ...................... 72/405; 72/421; 198/621; 198/774
[58] Field of Search .......... 72/405, 421; 198/621, 198/774, 486; 414/751, 752

[56] References Cited

U.S. PATENT DOCUMENTS

| 3,149,712 | 9/1964 | Soman | 198/486 |
| 3,609,843 | 10/1971 | Fiegel, Jr. et al. | 414/751 |
| 3,865,255 | 2/1975 | Krause | 414/753 |
| 4,228,993 | 10/1980 | Cathers | 198/486 |
| 4,259,052 | 3/1981 | Imanishi et al. | 72/405 |
| 4,428,221 | 1/1984 | Owens | 72/405 |

FOREIGN PATENT DOCUMENTS 118483 1/1958 U.S.S.R. .................. 72/405

Primary Examiner—Daniel C. Crane
Attorney, Agent, or Firm—Armstrong, Nikaido, Marmelstein & Kubovcik

[57] ABSTRACT

A conveyor in a plastic working machine, wherein lower dies and upper dies for plastic working of a work in collaboration are disposed on a plurality of working stations, respectively, the stations being set at intervals along the direction in which the work is conveyed, arms each having a handling mechanism for holding the work are provided on transfer bars disposed sideway of the working stations for conveying the work in sequence among the working stations, the transfer bars are provided on both sides of each working station, the arms are bridged between both the transfer bars with both the ends borne on both the transfer bars movably back and forth in the conveying direction or fixed to both the transfer bars.

6 Claims, 21 Drawing Figures

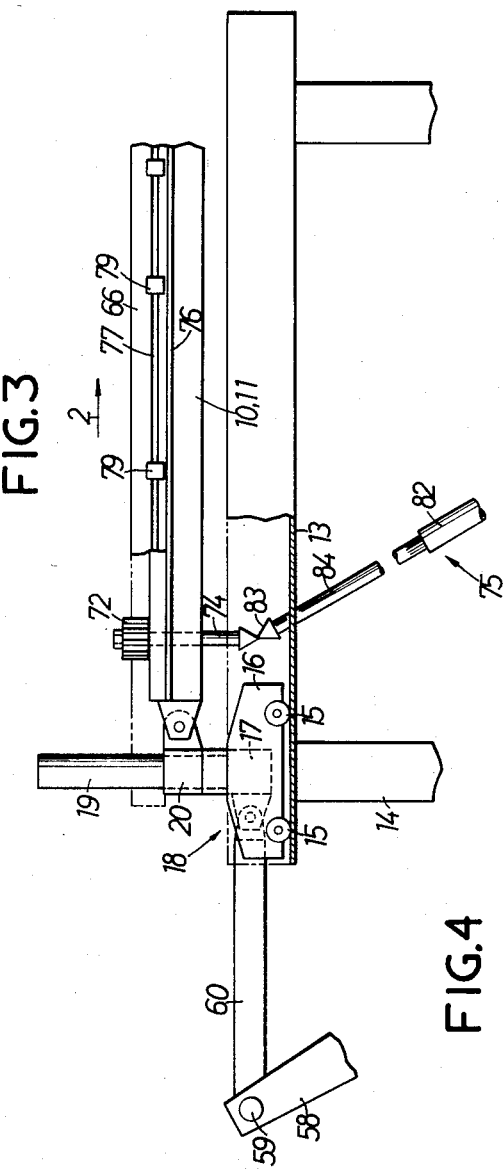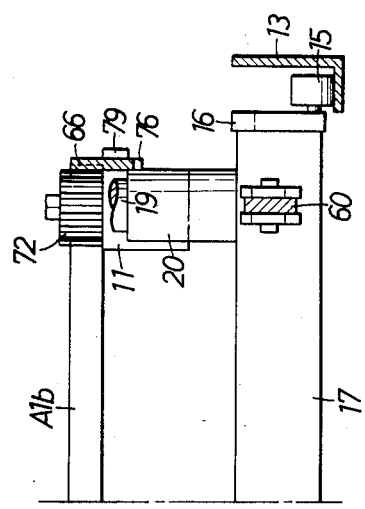

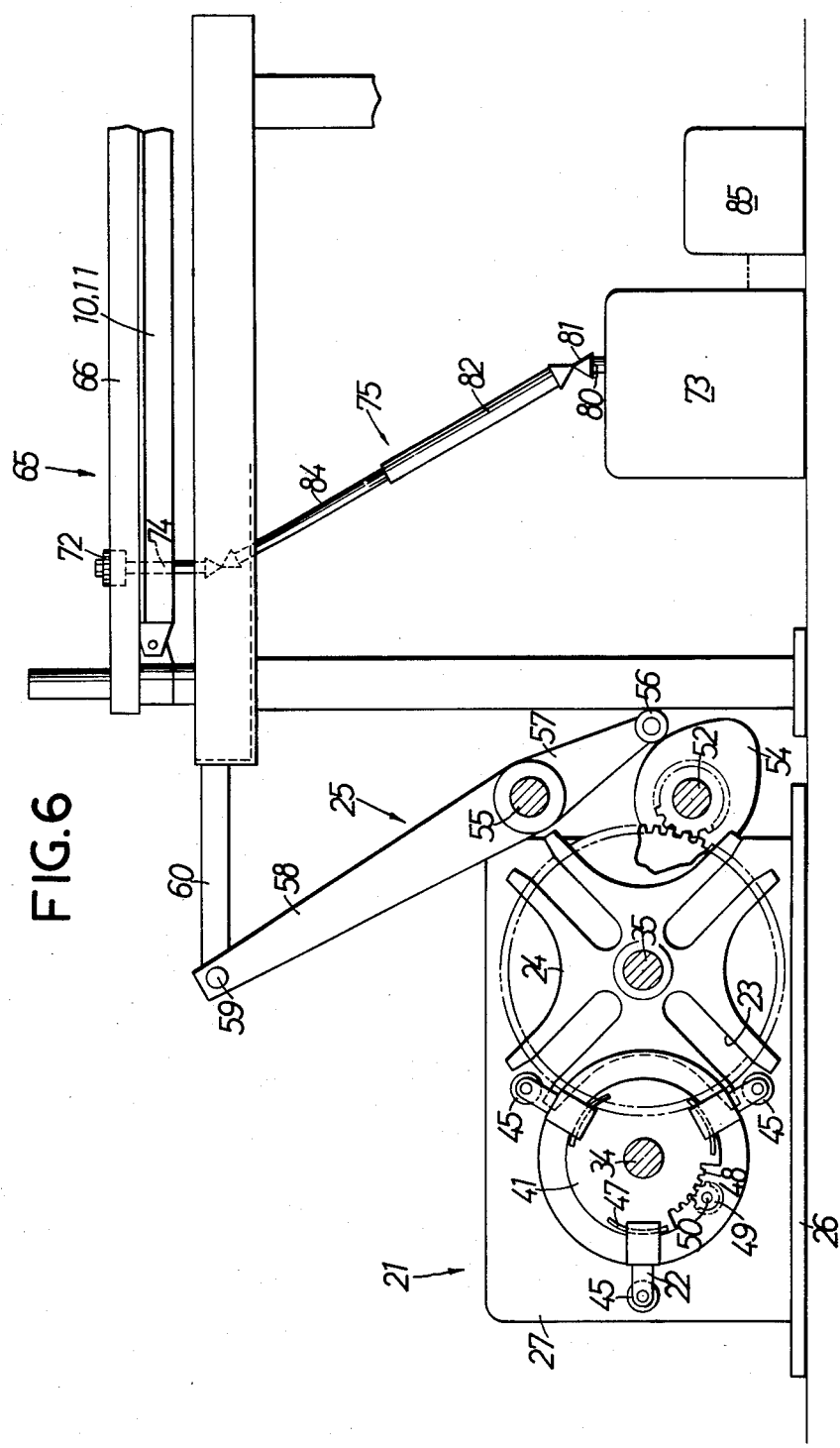

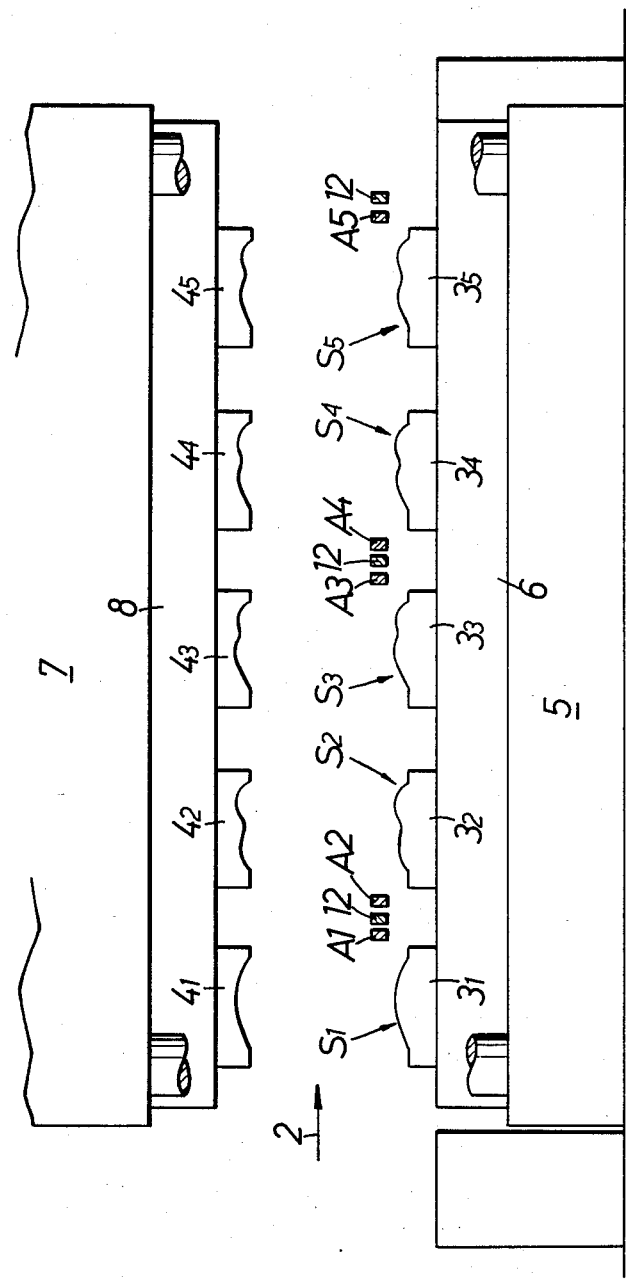

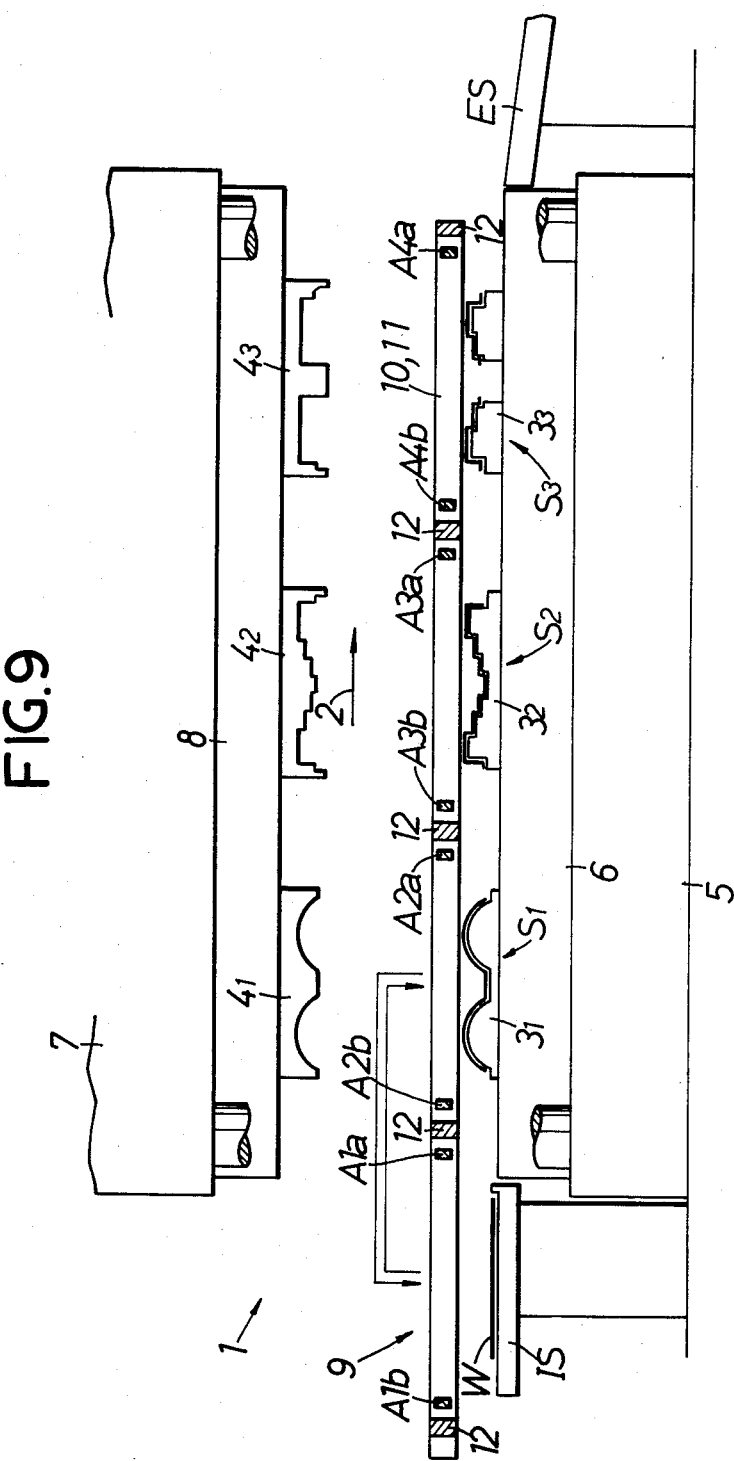

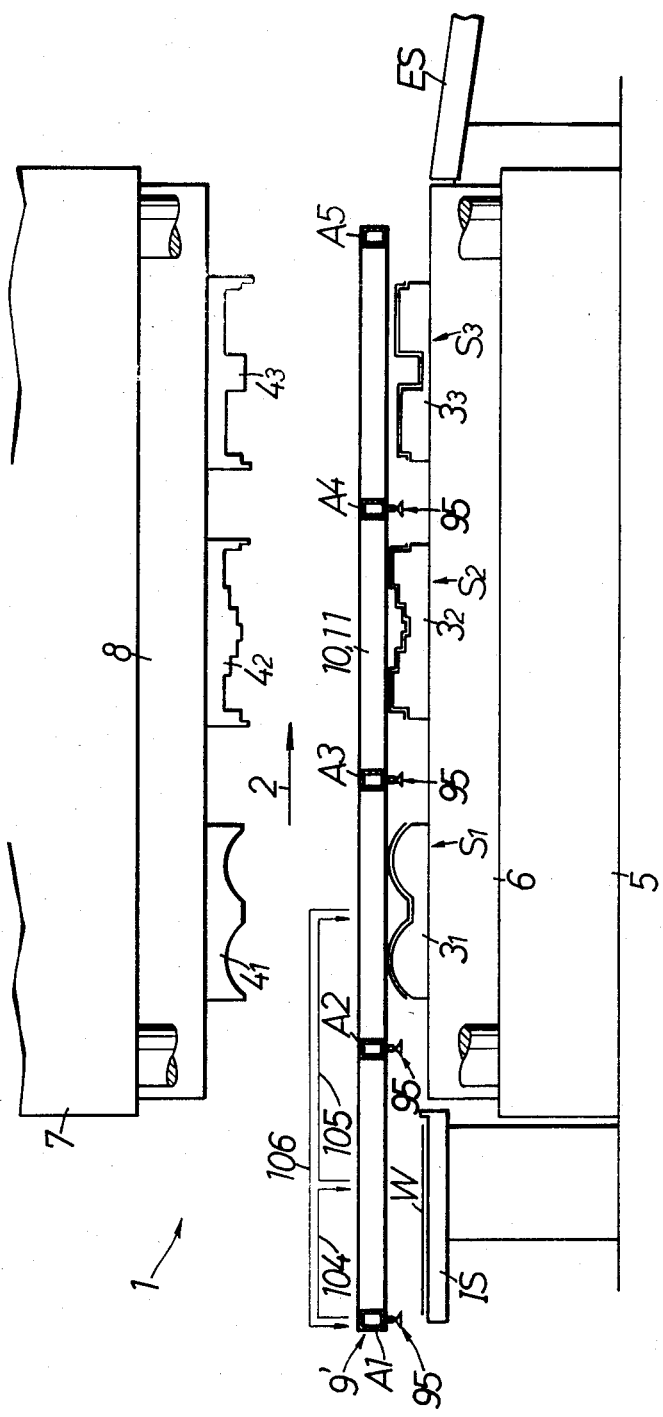

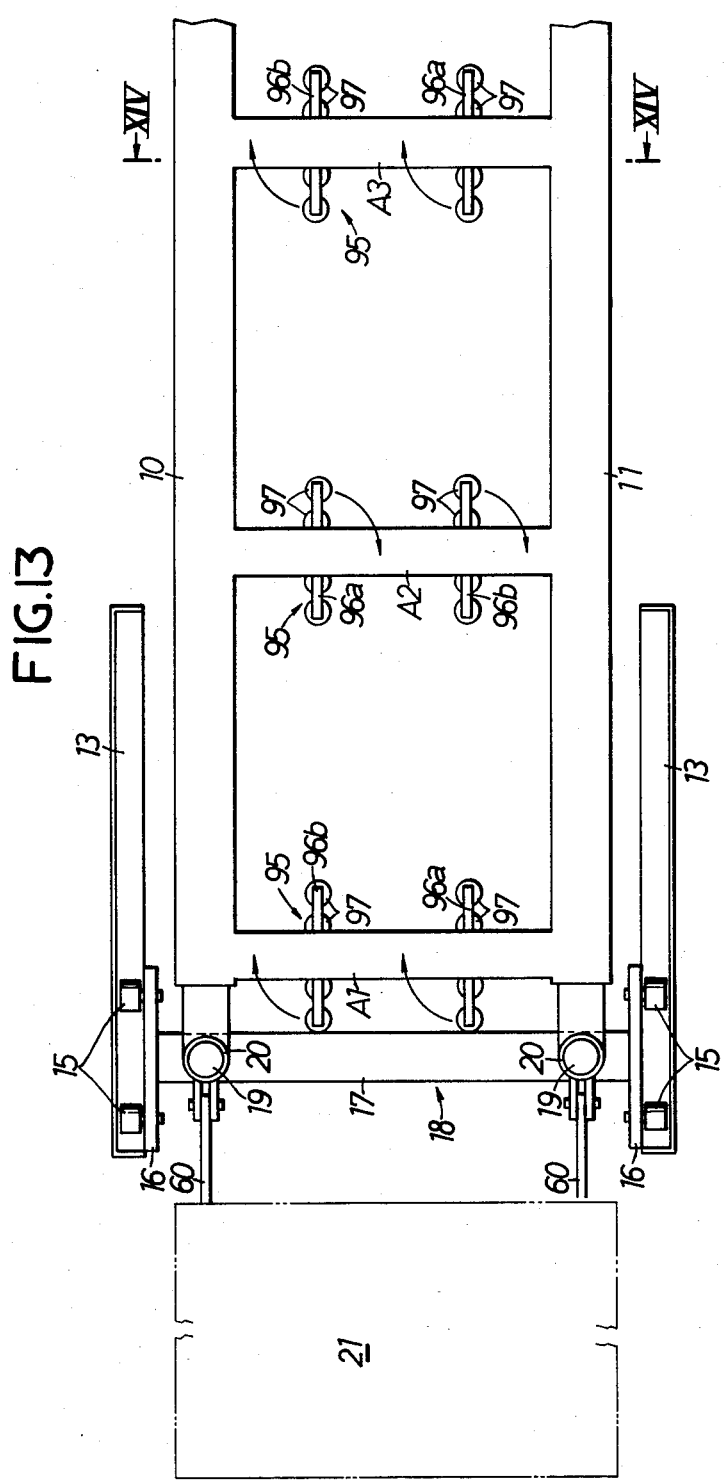

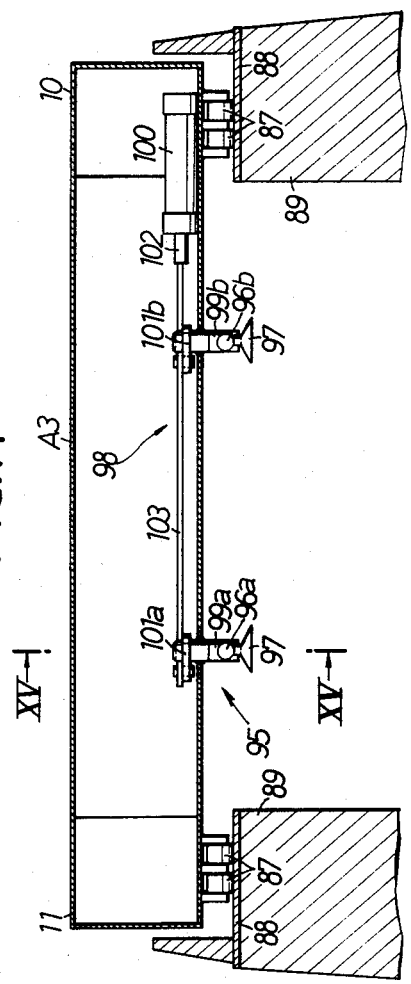
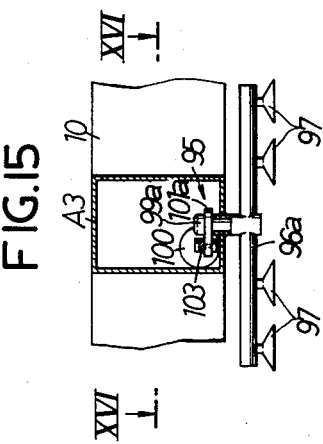

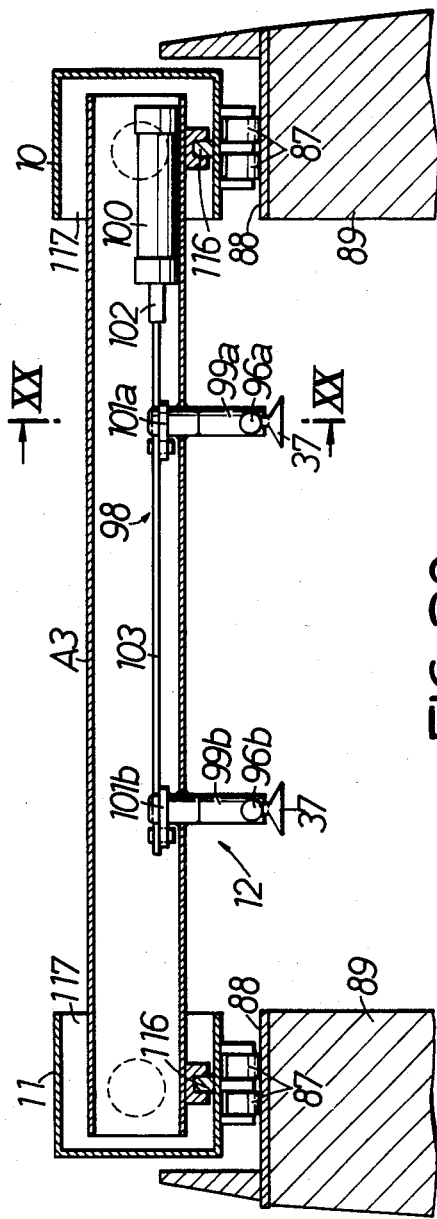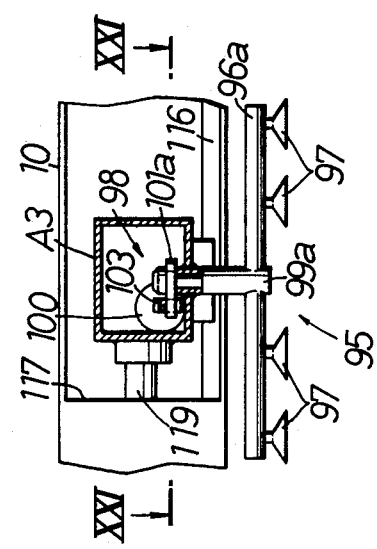

4,625,540

CONVEYOR IN PLASTIC WORKING MACHINE

BACKGROUND OF THE INVENTION

1. Field of the Invention

This invention relates to a conveyor in a plastic working machine wherein a lower die and an upper die for cooperatingly performing plastic working of works are disposed on each of a plurality of working stations set at intervals along the direction in which the works are conveyed, and an arm provided with a handling mechanism for holding the works is provided on a transfer bar disposed sideway of the working stations for conveying the works in sequence between the working stations.

2. Description of the Prior Art

In conveyors of the above type, an arm is provided on a transfer bar disposed on one side of the working stations and is extended toward the working stations, or arms are provided on a pair of transfer bars disposed on both sides of the working stations and are extended toward the interposed stations.

However, in a construction in which the arm is supported one-sidedly on the transfer bar as described, vibrations may be caused to the arm during conveyance, and thus works cannot be held securely or may drop unexpectedly in more undesirable cases.

SUMMARY OF THE INVENTION

This invention has been made in view of the above problems, and its object is to provide a conveyor in a plastic working machine capable of stabilizing a holding state of works by supporting an arm double-sidedly.

To attain such object, according to this invention, transfer bars are provided on both sides of the working stations, and an arm is bridged between and borne on both transfer bars with both ends thereof movable longitudinally along the direction in which works are conveyed or fixed to the transfer bars.

Owing to such construction, since both ends of the arm are supported by the transfer bars, vibration of the arm is minimized during conveying operation of the transfer bars, a work is held stably by a handling mechanism, and thus works can be conveyed securely.

The above and other objects, features and advantages of the invention will be elucidated from the following description of preferred embodiments with reference to the accompanying drawings.

BRIEF DESCRIPTION OF THE DRAWINGS

FIG. 1 to FIG. 7 represent a first embodiment of this invention, wherein

FIG. 1 is a general schematic side sectional view,

FIG. 2 is an enlarged plan view of a main part of FIG. 1,

FIG. 3 is a view taken on line III—III of FIG. 2,

FIG. 4 is an enlarged sectional view taken on line IV—IV of FIG. 2,

FIG. 5 is a plan view representing a construction of a driving means,

FIG. 6 is a sectional view taken on line VI—VI of FIG. 5,

FIG. 7 is an enlarged sectional view taken on line VII—VII of FIG. 2;

FIG. 8 is a general schematic side sectional view of a second embodiment which corresponds to FIG. 1;

FIG. 9 to FIG. 11 represent a third embodiment of this invention, wherein

FIG. 9 is a general schematic side sectional view,

FIG. 10 is an enlarged plan view of a main part of FIG. 9,

FIG. 11 is a sectional view taken on line XI—XI of FIG. 10;

FIG. 12 to FIG. 16 represent a fourth embodiment of this invention, wherein

FIG. 12 is a general schematic side view,

FIG. 13 is an enlarged sectional fiew of a main part of FIG. 12,

FIG. 14 is an enlarged sectional view taken on line XIV—XIV of FIG. 13,

FIG. 15 is a sectional view taken on line XV—XV of FIG. 14,

FIG. 16 is a sectional view taken on line XVI—XVI of FIG. 15;

FIG. 17 to FIG. 21 represent a fifth embodiment of this invention, wherein

FIG. 17 is a general schematic side sectional view,

FIG. 18 is an enlarged plan view of a main part of FIG. 17,

FIG. 19 is an enlarged sectional view taken on line XIX—XIX of FIG. 18,

FIG. 20 is a sectional view taken on line XX—XX of FIG. 19,

FIG. 21 is a sectional view taken on line XXI—XXI of FIG. 20.

DETAILED DESCRIPTION OF PREFERRED EMBODIMENTS

Figure 1:
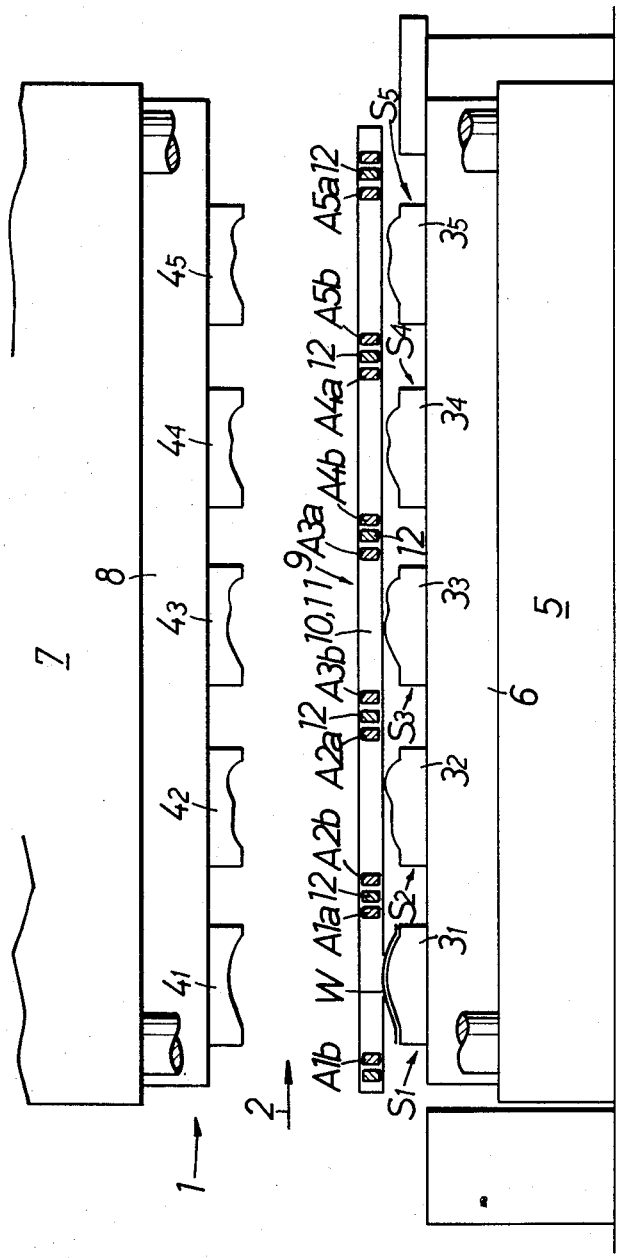

Referring now in detail to the drawings, in FIG. 1 which shows a first embodiment of this invention, a plurality of, for example, first to fifth working stations $S_1$ to $S_5$ in this embodiment are set at regular intervals along a direction 2 in which a work W is conveyed on a plastic working machine, for example, on a press 1, and lower dies $3_1$ to $3_5$ and upper dies $4_1$ to $4_5$ for pressing the work W in collaboration are disposed on the working stations $S_1$ to $S_5$, respectively. That is, the lower dies $3_1$ to $3_5$ are fixed at regular intervals on a bolster 6 on a pedestal 5 in the conveying direction 2, and the upper dies $4_1$ to $4_5$ are supported on a holder 8 fixed on an elevator 7 correspondingly to the lower dies $3_1$ to $3_5$. A conveyor 9 is provided additionally on the press 1, and after a press working between the lower dies $3_1$ to $3_5$ and the upper dies $4_1$ to $4_5$ according to a descent of the elevator 7, the conveyor 9 operates to convey the work W in sequence to the next working station in the conveying direction 2.

The conveyor 9 has a pair of transfer bars 10, 11 disposed in parallel with the conveying direction 2 on both sides of the working stations $S_1$ to $S_5$, and a plurality of arms A1a, A1b . . . A5a, A5b laid between the transfer bars 10, 11 and movable longitudinally in the conveying direction 2. The work W is conveyed according to displacements of the arms A1a, A1b . . . A5a, A5b and the transfer bars 10, 11, however, the working stations $S_1$ to $S_5$ are similar to each other in their construction, and hence a description will be given of the first working station $S_1$ and its neighborhood with reference to the drawings.

Figure 2:
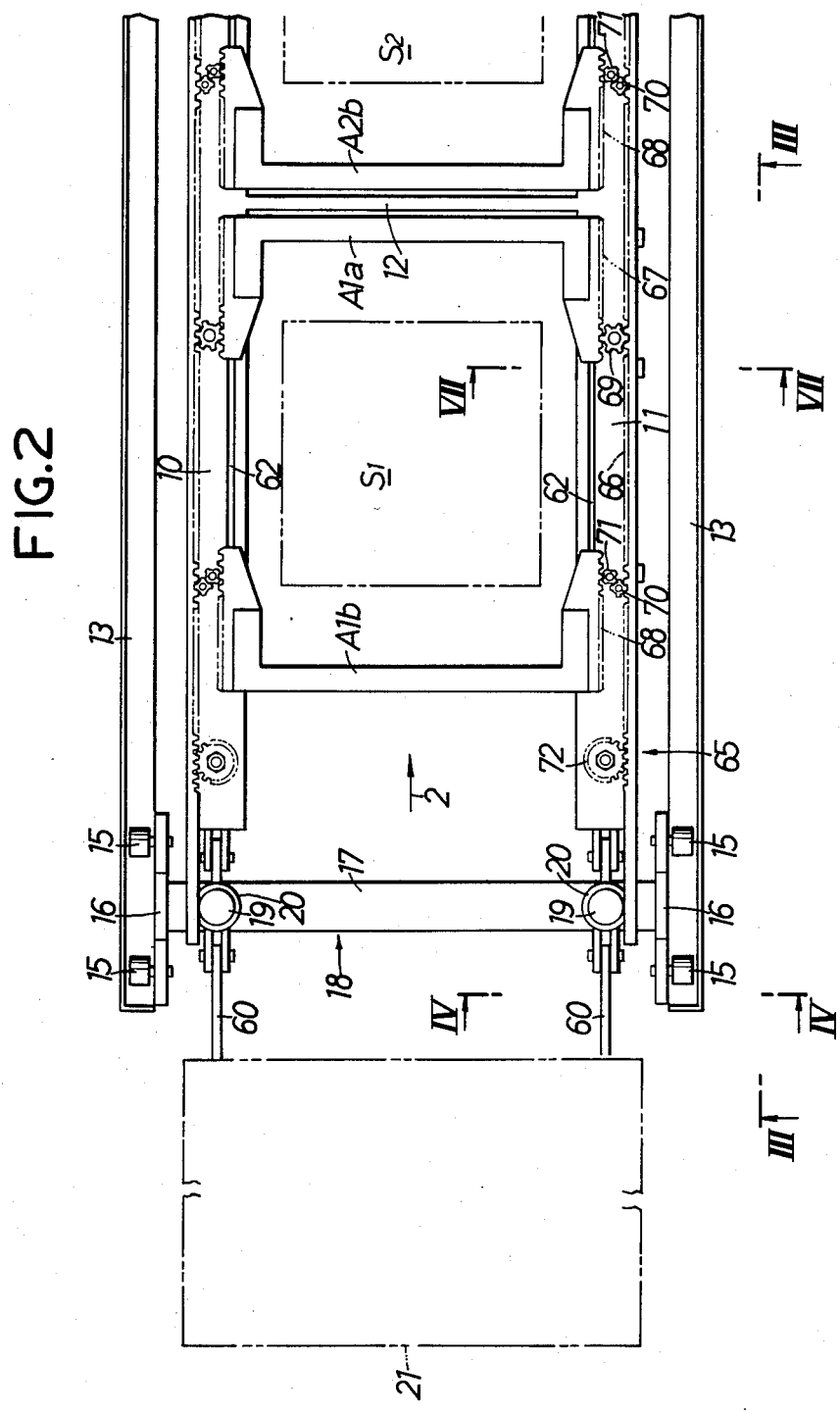

In also referring to FIG. 2, both the transfer bars 10, 11 are provided to extend from the first working station $S_1$ to the fifth working station $S_5$, and the transfer bars 10, 11 are coupled to each other through stays 12 located among the working stations $S_1$ to $S_5$. Further, each stay 12 is disposed so as to come at the center among the working stations $S_1$ to $S_5$, when both the transfer bars 10, 11 are kept stationary at the time of press working.

In referring further to FIG. 3 and FIG. 4, guide rails 13 extending horizontally in the conveying direction 2 are disposed on both outsides of the transfer bars 10, 11, and each guide rail 13 is supported by a strut 14 provided vertically on a floor surface. Travelling plates 16 are placed on both the guide rails 13 through a pair of wheels 15, and a truck 18 is constituted by coupling both the travelling plates 16 through a connecting rod 17. The truck 18 is capable of running on both the guide rails 13 longitudinally in the conveying direction 2, and is arranged on the guide rails 13 correspondingly at least to both ends of the transfer bars 10, 11. Then, guide rods 19 are provided vertically near both ends of the connecting rod 17, a cylindrical coupling member 20 is inserted movably up and down in each guide rod 19, and these coupling members 20 are ooupled to end portions of the transfer bars 10, 11. Consequently, both the transfer bars 10, 11 are movable longitudinally in the conveying direction 2 by running and driving the truck 18 on the guide rails 13 in the same direction. Both the transfer bars 10, 11 are also capable of moving vertically along the guide rods 19.

Figure 5:
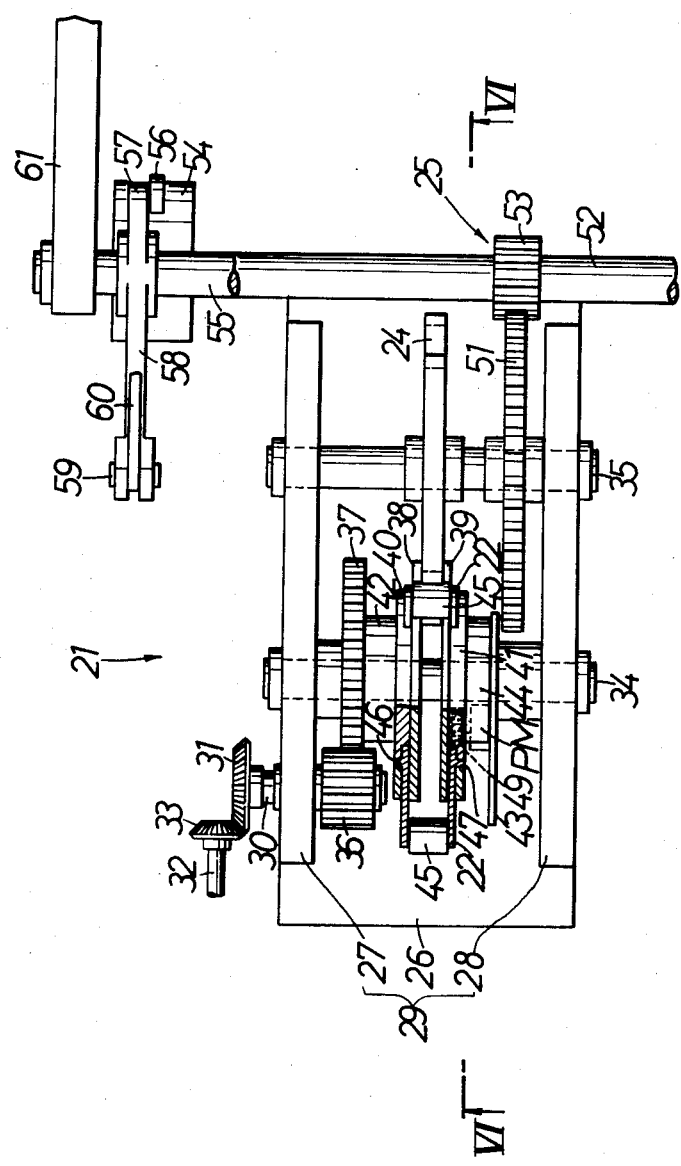

Next will be described construction of a driving means for driving the transfer bars 10, 11 with reference to FIG. 5 and FIG. 6. Driving means 21 for the transfer bars 10, 11 is provided with a mechanism for moving the transfer bars 10, 11 horizontally and another mechanism for moving both the transfer bars 10, 11 vertically. To move the transfer bars 10, 11 horizontally, the driving means 21 is provided with Geneva arms 22, a Geneva plate 24 having grooves 23 for receiving the Geneva arms 22 therein, and a transfer mechanism 25 for transforming a rotational motion of the Geneva plate 24 into a horizontal reciprocating motion and transferring it to the transfer bars 10, 11.

A pedestal 29 with a pair of side plates 27, 28 provided vertically at an interval therebetween on a baseplate 26 is fixed on the floor surface on an upper side than both the transfer bars 10, 11 in the conveying direction 2, and a bevel gear 31 is fixed on the end of a first rotating shaft 30 which is borne rotatably on the one side plate 27 and projects outward of the side plate 27. On the other hand, a bevel gear 33 is fixed on a transfer shaft 32 extended from a driving source (not shown) for driving the elevator 7, and the bevel gear 33 is engaged with the bevel gear 31. Second and third rotating shafts 34, 35 parallel with the first rotating shaft 30 are borne rotatably between both side plates 27, 28 of the pedestal 29. A first gear 36 is fixed on an end portion of the first rotating shaft 30 projecting inward from the one side plate 27, and this gear 36 is engaged with a second gear 37 fixed on the second rotating shaft 34. Accordingly, a rotation driving force transferred to the first rotating shaft 30 is transferred further to the second rotating shaft 34.

A pair of disklike rotary plates 38, 39 facing each other with an axial interval therebetween are fixed on midway of the second rotating shaft 34. Then, disklike adjusting plates 40, 41 are borne rotatably on the second rotating shaft 34 axially outwardly of respective plates 38, 39 and are rotatable relatively to the rotary plates 38, 39 and the second rotating shaft 34. A cylindrical regulating member 42 is interposed between the second gear 37 and the one adjusting plate 40, and another cylindrical regulating member 44 is interposed between a support plate 43 fixed on the second rotating shaft 34 and opposed other adjusting plate 41. Accordingly, both the adjusting plates 40, 41 are kept from moving axially of the second rotating shaft 34, and are in sliding contact with the rotary plates 38, 39, respectively.

The Geneva arms 22 are disposed at plural portions, for example, at three portions, at regular intervals in a circumferential direction of both the rotary plates 38, 39 and both the adjusting plates 40, 41. Roller 45 having an axis of rotation parallel with the axis of the second rotating shaft 34 is journaled in a loose end of each Geneva arm 22. Then, a base end of each Geneva arm 22 is engaged with both the rotary plates 38, 39 movably in the radial direction, and a projection 46 is provided on the base end and is engaged with a circular arc slit 47 perforated in each of the adjusting plates 40, 41 and trending radially inward at one circumferential end thereof. Accordingly, when the adjusting plates 40, 41 are displaced angularly relative to the rotary plates 38, 39, each Geneva arm 22 is forced to moves radially of the rotary plates 38, 39 and the adjusting plates 40, 41 and the amount of projection of the roller 45 at its loose end from the second rotating shaft 34 will change.

To drive and displace the adjusting plates 40, 41 at a relative angle to the rotary plates 38, 39, there is provided a sector gear 48 on one part of the circumference of the other adjusting plate 41, and a driving gear 49 engaging with the sector gear 48 is fixed on output shaft 50 of a pulse motor PM supported fixedly on the support plate 43. Accordingly, upon actuating the pulse motor PM, the other adjusting plate 41 is displaced at a relative angle to the rotary plates 38, 39, each Geneva arm 22 comes near to or apart from the second rotating shaft 34, accompanied by displacement of the one adjusting plate 40 at a relative angle to the rotary plates 38, 39.

The Geneva plate 24 is fixed on midway of the third rotating shaft 35 at a position corresponding to the rotary plates 38, 39. A plurality of, for example, four, grooves 23 are extended radially on the Geneva plate 24 with circumferentially regular intervals therebetween, and each Geneva arm 22 can be fitted in each groove 23. In accordance with the rotation of second rotating shaft 34, the rotary plates 38, 39 are rotated to cause concurrent rotation of each Geneva arm 22 and adjusting plates 40, 41, and then the Geneva arm 22 is fitted in the groove 23, rotating the Geneva plate 24 and the third rotating shaft 35. Further, in accordance as each Geneva arm 22 projects largely from the second rotating shaft 34, the roller 45 on the loose end of the Geneva arm 22 comes in contact with a side edge of the groove 23 on an upper side of the direction in which the Geneva plate 24 rotates, and the Geneva plate 24 is operated to run counter to a normal direction of rotation. Consequently, the third rotating shaft 35 can be delayed for rotational operation from start in actuation of a driving source for the elevator 7, namely from start in operation of the elevator 7, by the time according to the rate of projection of the Geneva plate 22, and the delay time can be adjusted by controlling the angular displacement of the adjusting plates 40, 41 relative to the rotary plates 38, 39.

A rotational operation of the Geneva plate 24, or a rotational operation of the third rotating shaft 35 is transferred to both the transfer bars 10, 11 through the transfer mechanism 25. The transfer mechanism 25 comprises a third gear 51 fixed on the third rotating shaft 35, a cam shaft 52 disposed rotatably around an axis parallel with the third rotating shaft 35, a fourth gear 53 engaging with the third gear 51 and fixed on the cam shaft 52, a pair of cams 54 fixed on both ends of the cam shaft 52, a link shaft 55 disposed rotatably around an axis parallel with the cam shaft 52, a pair of swing arms 57 each having one end fixed on the link shaft 55 and the other end journaling a cam roller 56 which is in slide contact with the associated cam 54, a pair of first links 58 each having one end fixed on the link shaft 55, and a pair of second links 60 with one end of each coupled to the other end of the first link 58 through a pin 59 parallel with the link shaft 55 and the other end coupled to the truck 18. The cam shaft 52 and the link shaft 55 are borne rotatably on a support member 61 fixed on the floor surface, respectively.

In the transfer mechanism 25, the third rotating shaft 35 is driven to rotate from the Geneva arm 22 through the Geneva plate 24 in accordance with an operation of the elevator 7, namely the upper dies $4_1$ to $4_5$, and further the the cam 54 is driven to rotate by engagement of the third gear 51 with the fourth gear 53. Since the cam roller 56 is in sliding contact with the cam 54 rotating along with the cam shaft 52, the swing arm 57 swings and the link shaft 55 rotates reciprocatingly in a certain range, thus shaking the first link shaft 58. Consequently, the second link 60 reciprocates longitudinally thereof, and both the transfer bars 10, 11 reciprocate longitudinally in the conveying direction 2 on the guide rails 13 through the truck 18.

To move the transfer bars 10, 11 vertically, there is provided a hydraulic cylinder (not shown) or the like between the connecting rod 17 of the truck 18 and both the transfer bars 10, 11, and thus the transfer bars 10, 11 are movable vertically according to an operation of the hydraulic cylinder.

Thus, the transfer bars 10, 11 are moved horizontally and vertically in the conveying direction 2 by the driving means 21, drawing a rectangular path within a vertical plane as a whole.

In referring again to FIG. 2, the arms A1a, A1b are laid between the transfer bars 10, 11 correspondingly to the first working station $S_1$ in the conveying direction 2, and the remaining arms A2a, A2b . . . A5a, A5b are also laid between the transfer bars 10, 11 longitudinally in the conveying direction 2 of the corresponding working stations $S_2$ to $S_5$. Accordingly, in adjacent working stations, a handling arm on the forward side in the conveying direction 2 and a handling arm on the rear side in that direction 2 are disposed on both sides of each stay 12. That is, for example, the arm A1a on the forward side in the conveying direction 2 in the first working station $S_1$ and the arm A2b on the rear side in the conveying direction 2 in the second working station $S_2$ are disposed on both sides of the stay 12.

In also referring to FIG. 7, a guide slot 62 extending in the conveying direction 2 is perforated in each the transfer bars 10, 11 correspondingly to the working stations $S_1$ to $S_5$. Then, a projection 64 projecting downward and having a locking part 63 at the nose is provided on the arms A1a, A1b . . . A5a, A5b, and each projection 64 is inserted in the guide slot 62 to have the locking part 63 locked on the transfer bars 10, 11. Accordingly, the arms A1a, A1b . . . A5a, A5b can be moved on the transfer bars 10, 11 through the guide slot 62 in the conveying direction 2.

An arm driving means 65 for driving such arms A1a, A1b . . . A5a, A5b comprises a pair of driving racks 66 disposed movably in the conveying direction 2 on sides of the transfer bars 10, 11, racks 67 provided on the arms A1a to A5a on the forward side in the conveying direction 2 in the working stations $S_1$ to $S_5$ and opposite to the driving racks 66, racks 68 provided on the arms A1b to A5b on the rear side in the conveying direction 2 in the working stations $S_1$ to $S_5$ and opposite to the driving racks 66, single pinions 69 interposed between the racks 67 and the driving racks 66 and journaled on the transfer bars 10, 11, pairs of pinions 70, 71 interposed between the racks 68 and the driving racks 66, respectively, and journaled on the transfer bars 10, 11, driving pinions 72 journaled on end portions of both the transfer bars 10, 11 and engaging with the driving racks 66, an arm driving source 73 fixed and disposed on the floor surface, and a power transfer mechanism 75 coupling a rotating shaft 74 of each driving pinion 72 to the arm driving source 73.

The driving rack 66 is provided extendedly in the conveying direction 2 and placed on a guide shelf 76 provided projectingly on a side wall of each of the transfer bars 10, 11. A guide slot 77 extending in the conveying direction 2 is perforated in side of each driving rack 66, a locking pin 78 provided on the transfer bars 10, 11 is inserted in the guide slot 77, and a locking part 79 provided on a tip of the locking pin 78 is locked on the driving rack 66. Accordingly, both the driving racks 66 can be moved longitudinally in the conveying direction 2 while sliding on the sides of the transfer bars 10, 11.

The arm driving source 73 is, for example, a pulse motor, and the power transfer mechanism 75 coupling an output shaft 80 of the driving source 73 to the rotating shaft 74 of the driving pinion 72 comprises a transfer cylinder 82 coupled to the output shaft 80 through a universal joint 81, and a transfer shaft 84 fitted in and spline-connected to the transfer cylinder 82 while being coupled to the rotating shaft 74 through a universal joint 83. Consequently, the power transfer mechanism 75 is capable of transferring a rotation driving force from the arm driving source 73 to the driving pinion 72 through the rotating shaft 74 irrespective of horizontal and/or vertical movement of the transfer bars 10, 11.

In the arm driving means 65, the driving racks 66 move forward or backward in the conveying direction 2 according to a rotational operation of the driving pinions 72. Operation of the driving racks 66 is transferred to the arms A1a to A5a through the pinions 69 and the racks 67 and thus the arms A1a to A5a move in a direction counter to the driving racks 66. Also, the operation of the driving racks 66 is transferred to the arms A1b to A5b through the paired pinions 70, 71 and the racks 68, and the arms A1b to A5b move in the same direction as the driving racks 66. Accordingly, the arms, for example, A1a, A2b on both sides of the stay 12 are moved by the driving means 65 in the directions counter to each other, or in the direction coming near to or apart from each other.

A control means 85 is connected to the arm driving source 73 for controlling the direction of rotation of the arm driving source 73 in such a manner that the arms A1a, A1b . . . A5a, A5b will be on standby among the working stations $S_1$ to $S_5$ at the time of press working by the lower dies $3_1$ to $3_5$ and the upper dies $4_1$ to $4_5$ and also the arms A1a, A1b . . . A5a, A5b will move onto the corresponding working stations $S_1$ to $S_5$ at the time of conveyance starting.

Further, suction means such as, for example, those employed in the later described fourth and fifth embodiments, are provided on lower portions of the arms A1a, A1b ... A5a, A5b, and the work W is held on the suction means.

Operation of this embodiment will next be described. After press working by the lower dies $3_1$ to $3_5$ and the upper dies $4_1$ to $4_5$ in the working stations $S_1$ to $S_5$, the conveyor 9 is actuated and the work W on the working stations $S_1$ to $S_5$ is conveyed to the next working stations $S_2$ to $S_5$ and a discharge position. That is, when the elevator 7 and the upper dies $4_1$ to $4_5$ integral therewith start ascending, first the arm driving means 65 is actuated and the corresponding arms A1a, A1b ... A5a, A5b are moved onto the working stations $S_1$ to $S_5$. Next, when the corresponding works are held on the arms A1a, A1b ... A5a, A5b, both the transfer bars 10, 11 are operated to ascend by the driving means 21, move horizontally forward in the conveying direction 2 to convey the works W onto the next working stations and then descend. The works W are thus placed onto the corresponding working stations by releasing each work W from being held on the arms A1a, A1b ... A5a, A5b. Both the transfer bars 10, 11 then move to the rear side in the conveying direction 2, and the arms A1a, A1b ... A5a, A5b return to the working stations $S_1$ to $S_5$ as they were. The arms A1a, A1b ... A5a, A5b are then reset among the working stations $S_1$ to $S_5$ by an operation of the arm driving means 65. Accordingly, there is nothing left to constitute an obstacle on the working stations $S_1$ to $S_5$, and the works W are subjected to press working according to the descending operation of the elevator 7 and the upper dies $4_1$ to $4_5$.

Thus, the works W are conveyed in sequence from the first working station $S_1$ to the fifth working station $S_5$ as repeating press work and conveyance, thereby completing a series of press working.

In such conveyor 9, the arms A1a, A1b ... A5a, A5b move to their standby positions among the working stations $S_1$ to $S_5$ at the time of press working, therefore as compared with the case wherein the arms are to be shunted aside hitherto, the time required for the move can be shortened considerably, and the press working operation need not be interrupted, thus assuring a smooth press working operation. Further, the work W is held on the paired arms A1a, A1b ... A5a, A5b, therefore the work W can be held stably. In addition, the intervals between the arms A1a and A1b; ... A5a and A5b and between the arms A1a and A2b; ... A4a and A5b on both sides of the stay 12 are adjustable through controlling the arm driving means 65, therefore the work W can be held securely by controlling the holding position of the arms according to a shape of the work W, and further the intervals among the working stations $S_1$ to $S_5$ can be set relatively small.

Also, the point at which the conveyor 9 starts operating is adjustable through controlling the amount of projection of the Geneva arms 22 from the second rotating shaft 34, and hence a conveyance starting point can be adjusted easily in response to a change in shape of the work W, thereby enhancing the rate of operation of the press 1.

Furthermore, since both the transfer bars 10, 11 are coupled together through the stays 12 among the working stations $S_1$ to $S_5$, the transfer bars 10, 11 can move synchronously and a vibration can be prevented.

Construction of the part for feeding the works W to the first working station $S_1$ is omitted for simplification of the description in the above embodiment, however, an arm similar in construction to those corresponding to the working stations $S_1$ to $S_5$ may be provided for the part.

Further in the above embodiment, the description refers to the case where the work W is held on two arms, however, in case the work W can be held on one arm, arms A1 to A5 may be disposed as in the second embodiment shown in FIG. 8. In this case, intervals among the working stations $S_1$ to $S_5$ are not necessarily equalized, and intervals between the second and third working stations $S_2$ and $S_3$ and the fourth and fifth working stations $S_4$, $S_5$ can be made smaller by, for example, letting the arms A1, A2 and A3, A4 be on standby between the first and second working stations $S_1$, $S_2$ and the third and fourth working stations $S_3$, $S_4$.

Further, a plurality of arms can be disposed on one side of the stay 12.

Figure 10:
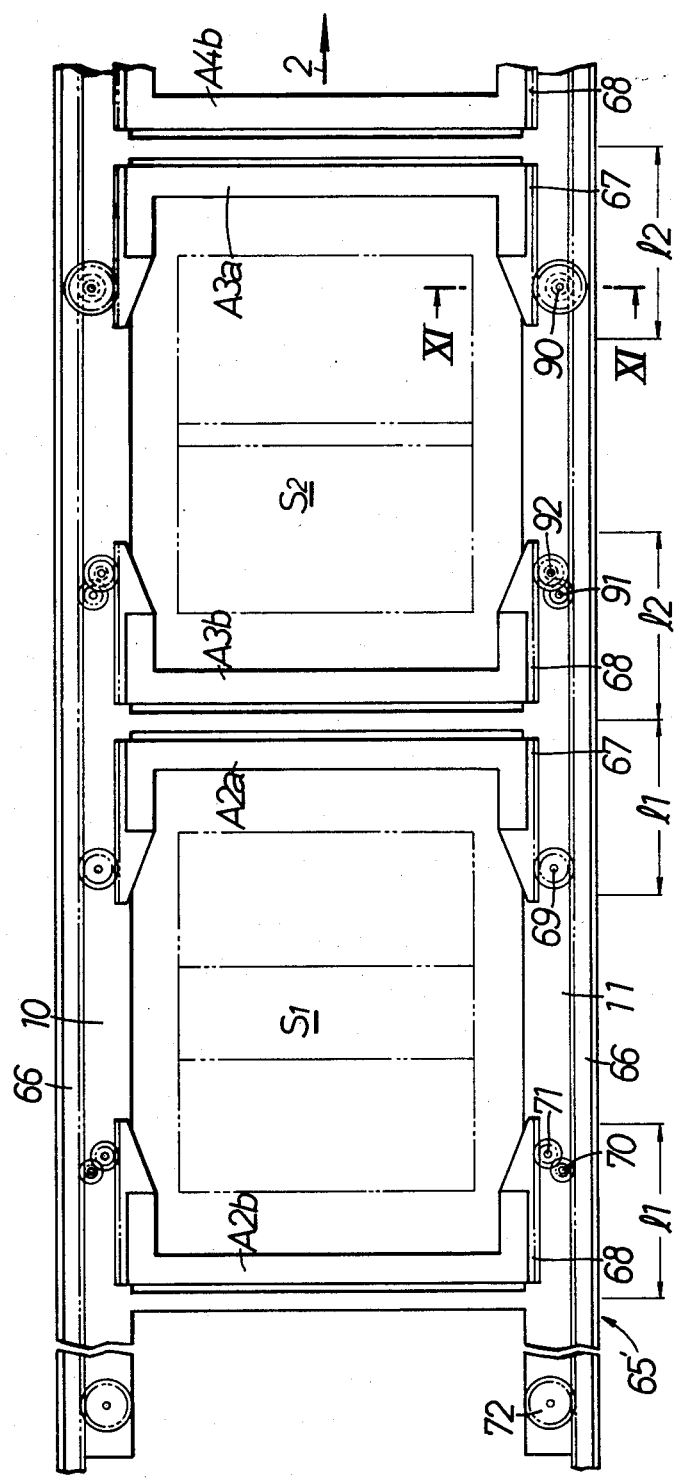
Figure 11:
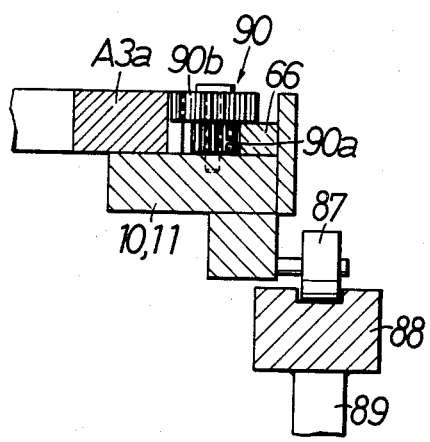
Figure 16:
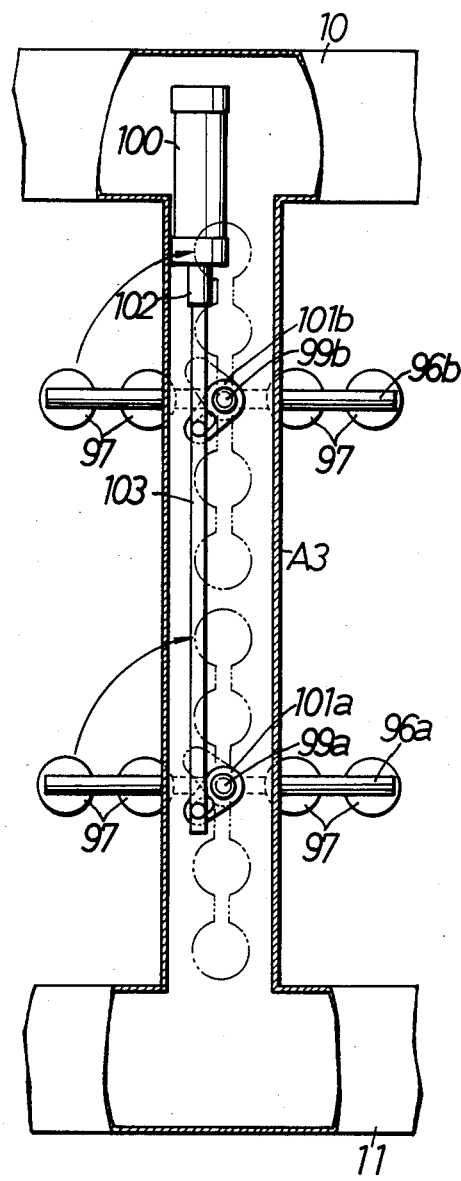

FIG. 9 to FIG. 11 represent a third embodiment of this invention, wherein parts corresponding to each embodiment described above are identified by the same reference characters.

In the press 1, the first to third working stations $S_1$, $S_2$, $S_3$ are set at regular intervals in the conveying direction 2 of the works W. For example, the first working station $S_1$ is for drawing, the second working station $S_2$ is for piercing and finishing, and the third working station $S_3$ is for trimming and splitting.

A carrying-in stand IS is provided in the rear of the pedestal 5 and the bolster 6 in the conveying direction 2, and a discharge shoot ES is provided in the front of the pedestal 5 and the bolster 6.

The arms A1a, A1b are laid between both the transfer bars 10, 11 correspondingly to the carrying-in stand IS longitudinally in the conveying direction 2, and the remaining arms A2a, A2b ... A4a, A4b are also laid between both the transfer bars 10, 11 longitudinally in the conveying direction 2 of the corresponding first to third working stations $S_1$ to $S_3$.

In FIG. 11, guide plates 88 extending horizontally in the conveying direction 2 are supported by struts 89 under the transfer bars 10, 11, and the transfer bars 10, 11 are placed on the guide plates 89 through rollers 87, respectively.

The arms A1a, A1b ... A4a, A4b are provided with suction means (not shown), and hence are capable of holding the work W on the carrying-in stand IS and the working stations $S_1$ to $S_3$ after moving in the direction away from the stay 12. However, in the case of arms A1a, A1b, A2a, A2b corresponding to the carrying-in stand IS and the first working station $S_1$, a better stability will be obtained if the arms are designed to move only a small distance l1 and to hold an end portion of the work W by the suction means. But in the case of arms A3a, A3b, A4a, A4b corresponding to the second and third working stations $S_2$, $S_3$, making the moving distance l2 relatively large may lead to a better stability.

Now, therefore, the arms A1a, A1b, A2a, A2b are moved by an arm driving means 65' for the relatively small distance l1, and the arms A3a, A3b, A4a, A4b are moved by the arm driving means 65' for the relatively large moving distance l2.

The arm driving means 65' is provided with a pair of driving racks 66 disposed movably on the transfer bars 10, 11 in the conveying direction 2, racks 67 provided on the arms A1a to A4a on forward side in the conveying direction 2 and opposite to the driving racks 66, racks 68 provided on the arms A1b to A4b on rear side in the conveying direction 2 and opposite to the driving racks 66, pinions 69 interposed between the racks 67 and the driving racks 66 at positions corresponding to the carrying-in stand IS and the first working station $S_1$, pinions 90 interposed between the racks 67 and the driving racks 66 at positions corresponding to the second and third working stations $S_2$, $S_3$, pairs of pinions 70, 71 interposed between the racks 68 and driving racks 66 at positions corresponding to the carrying-in stand IS and the first working station $S_1$, pairs of pinions 91, 92 interposed between the racks 68 and the driving racks 66 at positions corresponding to the second and third working stations $S_2$, $S_3$, and driving gears 72 journaled on end portions of the transfer bars 10, 11 and engaged with the driving racks 66. The driving gears 72 are driven to rotate reversibly by a driving source (not shown) such as pulse motor or the like.

The driving racks 66 move forward or backward in the conveying direction 2 according to a rotational operation of the driving gears 72. Movement of the driving racks 66 is transferred to the arms $A1a$ to $A4a$ through the pinions 69, 90 and the racks 67, and the arms $A1a$ to $A4a$ move in a direction counter to the driving racks 66. Further, the movement of the driving racks 66 is transferred to the other arms $A1b$ to $A4b$ through the pinions 70, 71, 91, 92 and the racks 68, and the arms $A1b$ to $A4b$ move in the same direction as the driving racks 66. Accordingly, the arms $A1a$, $A2b$, for example, on both sides of the stay 12 are movable by the arm driving means 65' in the direction counter to each other or in the direction coming apart from or coming near to each other.

Furthermore, as shown in FIG. 11, the pinion 90 comprises a gear part $90a$ engaging with the driving rack 66 and a gear part $90b$ engaging with the rack 67 and larger in size than the gear part $90a$, these parts being formed coaxially and in two stages vertically. The pinion 90 drives the rack 67 in the direction counter to the driving racks 66 at a moving distance larger than that of the latter. Also, one of the paired pinions 91, 92 comprises gear parts in two stages vertically likewise in the case of the pinion 90 and drives the rack 68 at a moving distance larger than that of the driving racks 66 in the same direction as the driving racks 66.

Accordingly, while the arms $A1a$, $A1b$, $A2a$, $A2b$ can move by the distance l1 in response to the movement of the driving racks 66 by the same distance due to the driving gear 72, the arms $A3a$, $A3b$, $A4a$, $A4b$ can move by the distance l2 which is larger than the distance l1.

According to this third embodiment, the moving distance is differentiated between the group of arms $A1a$, $A1b$, $A2a$, $A2b$ and the group of arms $A3a$, $A3b$, $A4a$, $A4b$ correspondingly to the shape of work W to be held, therefore the work W can be held more stably at an optimum position.

Although in the above embodiment a combined structure of rack and pinion is illustrated as the arm driving means 65', there may alternately be employed a cylinder, link motion or the like.

FIG. 12 to FIG. 16 represent a fourth embodiment of this invention, wherein parts corresponding to the preceding embodiments are identified by the same reference characters.

A conveyor 9' provided additionally on the press 1 comprises a pair of transfer bars 10, 11 disposed in parallel with the conveying direction 2 on both sides of the first to third working stations $S_1$ to $S_3$, first to fourth arms $A_1$ to $A_4$ laid between the transfer bars 10, 11, and handling mechanisms 95 mounted on the arms $A_1$ to $A_4$.

The first arm $A_1$ is provided horizontally to extend at right angles to the conveying direction 2, connecting between rear ends of both the transfer bars 10, 11, and the handling mechanism 95 mounted on the first arm $A_1$ functions to convey the work W on the carrying-in stand IS to the first working station $S_1$. Also, in order to convey the work at the first working station $S_1$ to the second working station $S_2$, the work W at the second working station $S_2$ to the third working station $S_3$, and the work W at the third working station $S_3$ to the discharge shoot ES, respectively, by the handling mechanism 95 mounted thereon, the second to fourth arms $A_2$ to $A_4$ are provided between the transfer bars 10, 11 in parallel with the first arm $A_1$. Further, the fifth arm $A_5$ is provided between front ends of the transfer bars 10, 11, however, the handling mechanism 95 is not mounted on the fifth arm $A_5$.

In FIG. 14, guide plates 88 extending horizontally in the conveying direction 2 are supported by struts 89 under both the transfer bars 10, 11, and the transfer bars 10, 11 are placed on the guide plates 88 through wheels 87.

Each handling mechanism 95 comprises a pair of support rods $96a$, $96b$ pivoted on each of the first to fourth arms $A_1$ to $A_4$ with an interval therebetween longitudinally, suction means 97 provided on both ends of the support rods $96a$, $96b$ as holding means, and turn driving means 98 provided on the arms $A_1$ to $A_4$ for turning the support rods $96a$, $96b$.

A pair of turning shafts $99a$, $99b$ with the lower ends projecting downward of the arms $A_1$ to $A_4$ are borne at longitudinally spaced portions and rotatably around an axis of the first to fourth arms $A_1$ to $A_4$, and longitudinal centers of the support rods $96a$, $96b$ are fixed to lower ends of the turning shafts $99a$, $99b$. Accordingly, the support rods $96a$, $96b$ are rotatable around the vertical axis. Each of the ends of the support rods $96a$, $96b$ has paired suction means 97 provided thereon.

The turn driving means 98 is incorporated in each the arms $A_1$ to $A_4$, comprising a hydraulic cylinder 100 adapted for expansive operation in a longitudinal direction of the arms $A_1$ to $A_4$, turning arms $101a$, $101b$ fixed to upper portions of the turning shafts $99a$, $99b$ in the arms $A_1$ to $A_4$ and extending radially outward of the turning shafts $99a$, $99b$, and a driving rod 103 coupled coaxially with a piston rod 102 of the hydraulic cylinder 100 and pinned to noses of the turning arms $101a$, $101b$.

Owing to such turn driving means 98, an expansive operation of the hydraulic cylinder 100 causes both the support rods $96a$, $96b$ to be driven and turned between an enclosed state parallel with the arms $A_1$ to $A_4$ and a projecting state orthogonal to the arms $A_1$ to $A_4$ and projecting to both sides of the arms through the driving rod 103, the turning arms $101a$, $101b$ and the turning shafts $99a$, $99b$.

Referring next to operation of this embodiment, the transfer bars 10, 11 take standby positions and the arms $A_1$ to $A_5$ are located among the carrying-in stand IS, the working stations $S_1$ to $S_3$ and the discharge shoot ES at the time of press working by the lower dies $3_1$ to $3_3$ and the upper dies $4_1$ to $4_3$ in the working stations $S_1$ to $S_3$. That is, the first arm $A_1$ is positioned in the rear of the carrying-in stand IS in the conveying direction 2, the second to fifth arms $A_2$ to $A_4$ are positioned between the carrying-in stand IS and the first working station $S_1$, the first and second working stations $S_1$, $S_2$, the second and third working stations $S_2$, $S_3$, and the third working station $S_3$ and the discharge shoot ES, respectively. In such state, the handling mechanisms 95 mounted on the first to fourth arms $A_1$ to $A_4$ each has the support rods 96a, 96b enclosed in parallel with the arms $A_1$ to $A_4$.

When the press working by the lower dies $3_1$ to $3_3$ and the upper dies $4_1$ to $4_3$ in the working stations $S_1$ to $S_3$ ends and thus the upper dies $4_1$ to $4_3$ raise, each handling mechanism 95 keeps the support rods 96a, 96b in a state projecting orthogonally to the arms $A_1$ to $A_4$. Further, the transfer bars 10, 11 ascend once, as indicated by an arrow 104, move horizontally until the arms $A_1$ to $A_4$ are positioned over the carrying-in stand IS and the working stations $S_1$ to $S_3$, and then descend. Thus, the works W on the carrying-in stand IS and the working stations $S_1$ to $S_3$ are held on the suction means 97 of the handling mechanism 95 in the first to fourth arms $A_1$ to $A_4$.

Next, the transfer bars 10, 11 ascend once, as indicated by an arrow 105, move horizontally until the first to fourth arms $A_1$ to $A_4$ arrive over the next working stations $S_1$ to $S_3$ and the discharge shoot ES, and then descend, releasing each work W from being held by the suction means 97. Thus, the works W on the carrying-in stand IS and the working stations $S_1$ to $S_3$ are conveyed to the next working stations $S_1$ to $S_3$ and the discharge shoot ES.

The transfer bars 10, 11 then return, as indicated by an arrow 106, to a standby position shown in FIG. 12, however, each handling mechanism 95 returns the support rods 96a, 96b to the enclosed state in this case.

As press working and conveyance are repeated alternately, the works W are conveyed to the discharge shoot ES from the carrying-in stand IS through the first to third working stations $S_1$ to $S_3$ in sequence, and thus a series of the press working is completed.

In such conveyor 9', the support rods 96a, 96b of each handling mechanism 95 are kept in an enclosed state parallel with the arms $A_1$ to $A_4$ during the period of the transfer bars 10, 11 being on standby for the press working by the lower dies $3_1$ to $3_3$ and the upper dies $4_1$ to $4_3$. Accordingly, the support rods 96a, 96b can be free from touching the lower dies $3_1$ to $3_3$ and the upper dies $4_1$ to $4_3$, and intervals among the carrying-in stand IS, the working stations $S_1$ to $S_3$ and the discharge shoot ES can be shortened relatively, thus attaining a miniaturization of the entire press 1.

As a further embodiment of this invention, the driving means of the handling mechanism 95 may be designed as of transforming the expansive operation of the hydraulic cylinder 100 into a turning motion of the turning shafts 99a, 99b through rack and pinion, or the turning shafts 99a, 99b can be turned by a pulse motor.

FIG. 17 to FIG. 21 represent a fifth embodiment of this invention, wherein parts corresponding to the fourth embodiment are identified by the same reference characters. The fifth embodiment is analogous to the fourth embodiment, however, what is noticeable above all is that the arm can be partly moved longitudinally in the conveying direction 2.

A conveyed distance of the work W from the carrying-in stand IS to the first working station $S_1$ and a conveyed distance of the work W from the first working station $S_1$ to the second working station $S_2$ are of a value 13, however, a conveyed distance 14 of the work W from the second working station $S_2$ to the third working station $S_3$ is set larger by a distance 15 than the distance 13, because a scrap shoot hole 115 is provided ahead of the lower die $3_2$ in the conveying direction 2 in the second working station $S_2$. That is, $14-13=15$. Consequently, while both ends of the first, second and fourth arms $A_1$, $A_2$, $A_4$ are fixed to both the transfer bars 10, 11, both ends of the third arm $A_3$ are borne movably back and forth in the conveying direction 2 on the transfer bars 10, 11.

That is, guide rails 116 extending in the conveying direction 2 are provided on the transfer bars 10, 11 at a position corresponding to that between the first and second working stations $S_1$, $S_2$ when the transfer bars 10, 11 are kept at a standby position, and both ends of the third arm $A_3$ are borne movably back and forth in the conveying direction 2 on the guide rails 116. Further, length of the guide rail 116 is set so as to move the third arm $A_3$ by the distance 15 at least, and a hydraulic cylinder 118 as the driving means is supported on a support plate 117 provided orthogonally to the conveying direction 2 correspondingly to both ends of the guide rail 116. A piston rod 119 of the hydraulic cylinder 118 is coupled to the third arm $A_3$ movably through the support plate 117, and hence the third arm $A_3$ is movable longitudinally along the conveying direction 2 by an expansive operation of the hydraulic cylinder 118.

Referring next to operation of the embodiment, when a press working is carried out by the lower dies $3_1$ to $3_3$ and the upper dies $4_1$ to $4_3$ in the working stations $S_1$ to $S_3$, both the transfer bars 10, 11 are on standby positions and the arms $A_1$ to $A_5$ are located among the carrying-in stand IS, the working stations $S_1$ to $S_3$ and the discharge shoot ES. That is, the first arm $A_1$ is positioned on the rear of the carrying-in stand IS in the conveying direction 2, the second to fifth arms $A_2$ to $A_5$ are positioned between the carrying-in stand IS and the first working station $S_1$, between the first and second working stations $S_1$, $S_2$, between the second and third working stations $S_2$, $S_3$, and between the third working station $S_3$ and the discharge shoot ES, respectively. Under such state, the third arm $A_3$ takes a position at the distance 13 apart from the second arm $A_2$ and at 14 apart from the fourth arm $A_4$. Further, each handling mechanism 95 has the support rods 96a, 96b enclosed in parallel with the arms $A_1$ to $A_4$.

When the press working by the lower dies $3_1$ to $3_3$ and the upper dies $4_1$ to $4_3$ in the working stations $S_1$ to $S_3$ ends and then the upper dies $4_1$ to $4_3$ ascend, each handling mechanism 95 holds the rods 96a, 96b in a state projecting at right angles to the arms $A_1$ to $A_4$. Further, the transfer bars 10, 11 ascend once as indicated by the arrow 104 of FIG. 17, move until the arms $A_1$ to $A_4$ are positioned over the carrying-in stand IS and the working stations $S_1$ to $S_3$, and then descend. Thus, the works W on the carrying-in stand IS and the working stations $S_1$ to $S_3$ are held by the suction means 97 of the handling mechanism 95 of the first to fourth arms $A_1$ to $A_4$.

Next, the transfer bars 10, 11 once ascend as indicated by the arrow 105, and further move horizontally forward in the conveying direction 2. In this case, the third arm $A_3$ moves relatively forward by the distance 15 to both the transfer bars 10, 11 according to an expansive operation of the hydraulic cylinder 118. Thus, when the first and second arms $A_1$, $A_2$ arrive over the lower dies $3_1$, $3_2$ of the first and second working stations $S_1$, $S_2$, the third arm $A_3$ arrives over the lower die $3_3$ of the third working station $S_3$. That is, while the first, second and fourth arms $A_1$, $A_2$, $A_4$ move forward by the distance 13 according to the forward motion of both the transfer bars 10, 11 by the distance 13, the third arm $A_3$ moves forward by the distance 14 which is larger than the distance 13. Both the transfer bars 10, 11 descend after the horizontal move, and each work W is released from holding by the suction means 97 in each handling mechanism 95. Thus, the works W on the carrying-in stand IS and the working stations $S_1$ to $S_3$ are completed their conveyance to the next working stations $S_1$ to $S_3$ and the discharge shoot ES.

Figure 17:
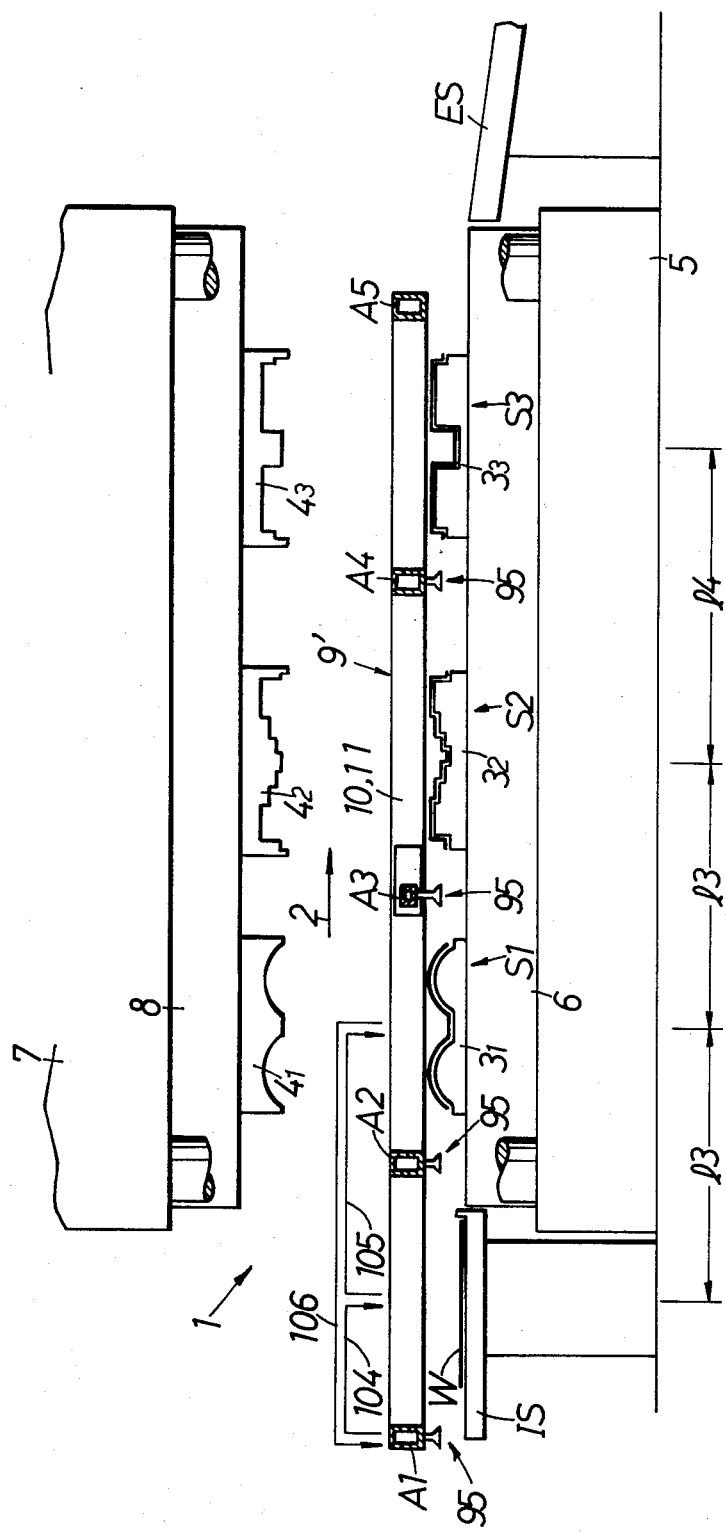
Figure 18:
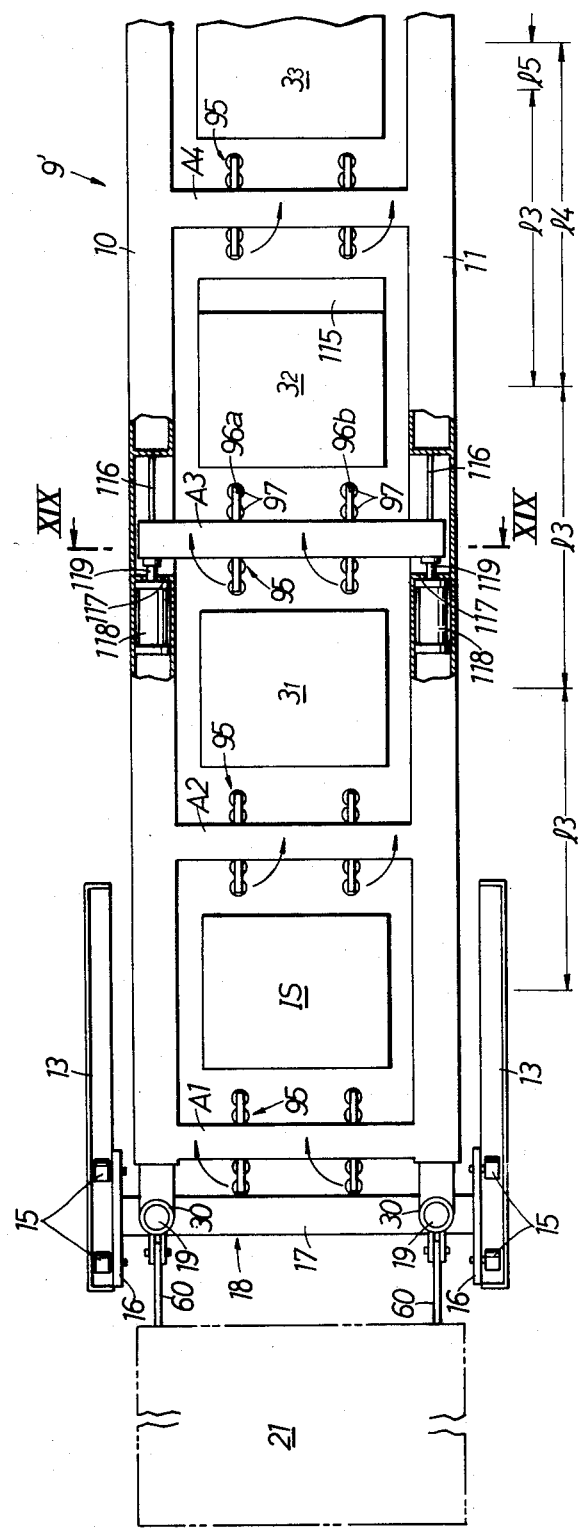
Figure 21:
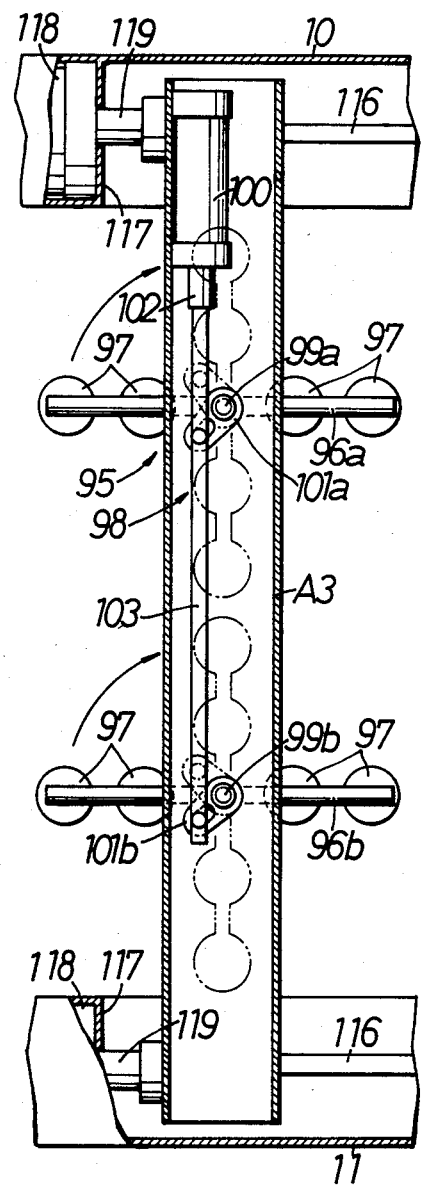

Both the transfer bars 10, 11 then return to the standby position shown in FIG. 17 as indicated by the arrow 106, however, the third arm $A_3$ further moves rearward in the conveying direction 2 by the distance l4 according to the contracting operation of the hydraulic cylinder 118, and all the arms $A_1$ to $A_5$ return to their original positions. Further, the handling mechanism 95 of the arms $A_1$ to $A_4$ keeps the support rods 96a, 96b enclosed in parallel with the arms $A_1$ to $A_4$.

As press working and conveyance are repeated alternately, the works W are conveyed to the discharge shoot ES from the carrying-in stand IS in sequence through the first to third working stations $S_1$ to $S_3$, and thus a series of press working comes to completion.

In such conveyor 9', since the third arm $A_3$ is made to move longitudinally in the conveying direction 2 relatively to both the transfer bars 10, 11, the interval between the second and third working stations $S_2$, $S_3$ can be made larger than that between the first and second working stations $S_1$, $S_2$. That is, it is not necessary to equalize the interval between the first and second working stations $S_1$, $S_2$ to that between the second and third working stations $S_2$, $S_3$, thus shortening the conveyor 9' in length in the conveying direction 2.

In the above embodiment, only the third arm $A_3$ is made movable relatively to the transfer bars 10, 11, however, the other arms can also be made movable relatively thereto.

What is claimed is:

1. In a working machine having pairs of lower dies and upper dies disposed at a plurality of working stations, respectively, for cooperatively working a workpiece at the respective stations, the stations being set at intervals in a direction of conveyance of the workpiece, a conveyor comprising:

a pair of transfer bars disposed on opposite lateral sides of each working station of said plurality of working stations and extending parallel to each other in the conveying direction, said pair of transfer bars being fixed relatively to each other and spaced from one another a predetermined distance and being unitarily movable in a vertical direction as well as in said conveying direction by respective driving means;

a plurality of unitary arms disposed laterally bridging between the pair of transfer bars such that each unitary arm extends at least said predetermined distance, said arms being displaceable in the conveying direction relative to the transfer bars between an inoperative position and an operative position through operation of a driving means; and a handling mechanism disposed on each arm for holding the workpiece;

whereby during operation of conveyor, the arms are moved from their inoperative positions to the operative positions for holding and releasing the workpiece, thereby allowing, in cooperation with the operation of the transfer bars, the workpiece to be conveyed in sequence from working station to working station.

2. In a working machine as claimed in claim 1, wherein said transfer bars are connected together by means of stays and said inoperative positions of the arms are located adjacent the stays.

3. In a working machine as claimed in claim 1 or 2, wherein said arms are provided in pair for each working station and the pair of arms are moved toward each other in operative state for cooperatively engaging the workpiece on the station.

4. In a working machine as claimed in claim 1, wherein distance between the inoperative position and operative position of certain of the arms is set differently from that of the other arms.

5. In a working machine as claimed in claim 1, wherein said handling mechanism comprises suction means.

6. In a working machine as claimed in claim 1, wherein spaces provided between the working stations are used as resting places for the arms at the time of operation of the working machine.

* * * * *